US012382557B2

(12) United States Patent
Chang et al.

(10) Patent No.: US 12,382,557 B2
(45) Date of Patent: Aug. 5, 2025

(54) ELECTRONIC DEVICE AND CONTROL METHOD THEREOF

(71) Applicant: CARUX TECHNOLOGY PTE. LTD., Singapore (SG)

(72) Inventors: Yi-Cheng Chang, Tainan (TW); Wen-Tai Chiang, Tainan (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 274 days.

(21) Appl. No.: 18/315,656

(22) Filed: May 11, 2023

(65) Prior Publication Data

US 2023/0422368 A1 Dec. 28, 2023

Related U.S. Application Data

(60) Provisional application No. 63/354,384, filed on Jun. 22, 2022.

(30) Foreign Application Priority Data

Mar. 28, 2023 (CN) ......................... 202310320651.8

(51) Int. Cl.
*H05B 45/18* (2020.01)
*H05B 47/105* (2020.01)

(52) U.S. Cl.
CPC ........... *H05B 45/18* (2020.01); *H05B 47/105* (2020.01)

(58) Field of Classification Search
CPC .............................. H05B 45/18; H05B 47/105
See application file for complete search history.

(56) References Cited

U.S. PATENT DOCUMENTS

| | | | | |
|---|---|---|---|---|
| 10,694,599 | B2 | 6/2020 | Zhai et al. | |
| 2020/0022234 | A1* | 1/2020 | Pope | H05B 47/1965 |
| 2021/0088575 | A1* | 3/2021 | Huang | G01R 31/2635 |
| 2022/0059510 | A1 | 2/2022 | Su et al. | |

FOREIGN PATENT DOCUMENTS

| | | | |
|---|---|---|---|
| CN | 104797060 | A | 7/2015 |
| TW | 202209725 | A | 3/2022 |

* cited by examiner

*Primary Examiner* — Daniel D Chang
(74) *Attorney, Agent, or Firm* — McClure, Qualey & Rodack, LLP

(57) ABSTRACT

An electronic device includes a plurality of light-emitting elements, a temperature sensor, and a control element. The control element includes a storage unit, a comparison unit, and a first control unit. The storage unit stores a look-up table including different correspondences between different temperature ranges and different power thresholds. The comparison unit receives the first power consumption of the light-emitting elements, determines the predetermined power threshold in the different correspondences of the look-up table according to the ambient temperature, and compares the first power consumption with the predetermined power threshold to determine the second power consumption. The first power consumption is obtained by measuring the light-emitting elements. The first control unit drives the light-emitting elements according to the second power consumption.

20 Claims, 7 Drawing Sheets in temperature Tr in temperature Th (Th>Tr)

in temperature Th (Th>Tr)

ELECTRONIC DEVICE AND CONTROL METHOD THEREOF

CROSS REFERENCE TO RELATED APPLICATIONS

This application claims the benefit of U.S. Provisional Application No. 63/354,384, filed on Jun. 22, 2022, and China Application No. 202310320651.8, filed on Mar. 28, 2023, the entirety of which is incorporated by reference herein.

BACKGROUND OF THE DISCLOSURE

Field of the Invention

The present invention relates to an electronic device, and, in particular, to an electronic device including light-emitting elements and a control method for controlling the electronic device according to power thresholds.

Description of the Related Art

Displays use low luminance to protect the components while operating in high-temperature environments, due to the temperature limit of the components, and to keep them from exceeding their temperature limit. Existing displays can set multiple temperature ranges. The multiple temperature ranges correspond to different respective luminance levels. As the ambient temperature increases, the luminance of the display will also decrease. However, a high-brightness display cannot be obtained if the user is in a high-temperature environment (such as under the sun), because the luminance of the entire display is reduced.

BRIEF SUMMARY OF THE DISCLOSURE

An embodiment of the present disclosure provides an electronic device. The electronic device includes a plurality of light-emitting elements, a temperature sensor, and a control element. The control element includes a storage unit, a comparison unit, and a first control unit. The storage unit stores a look-up table including different correspondences between different temperature ranges and different power thresholds. The comparison unit receives the first power consumption of the light-emitting elements, determines the predetermined power threshold in the different correspondences of the look-up table according to the ambient temperature, and compares the first power consumption with the predetermined power threshold to determine the second power consumption. The first power consumption is obtained by measuring the light-emitting elements. The first control unit drives the light-emitting elements according to the second power consumption.

An embodiment of the present disclosure also provides a control method for an electronic device. The control method includes the following stages. An ambient temperature is detected. A look-up table including different correspondences between different temperature ranges and different power thresholds is obtained. The first power consumption of the light-emitting elements is obtained. The predetermined power threshold in the different correspondences of the look-up table is determined according to the ambient temperature. The first power consumption and the predetermined power threshold are compared to determine the second power consumption. The light-emitting elements are driven according to the second power consumption.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

Figure 1:
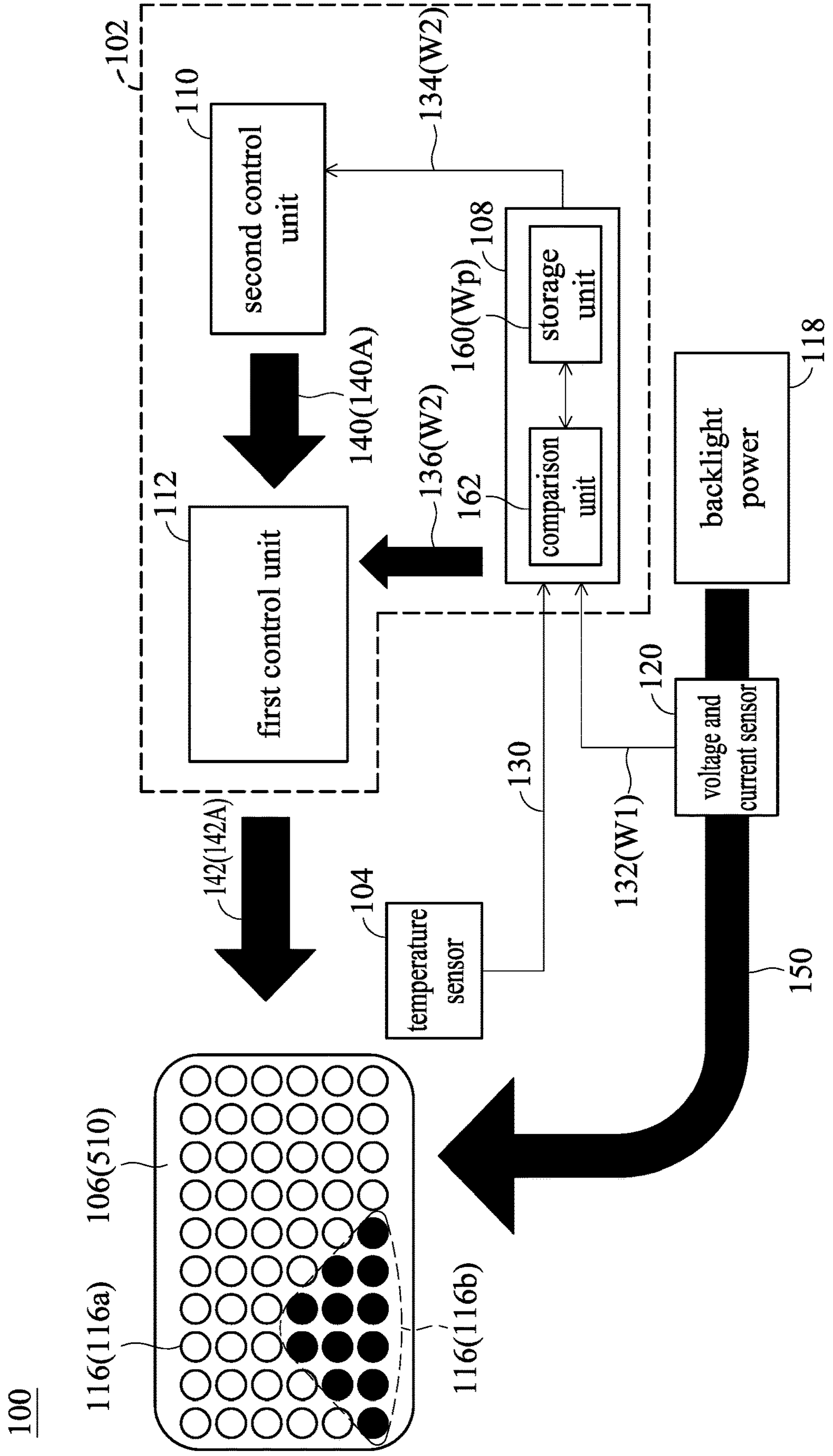
FIG. 1 is a schematic diagram of an electronic device 100 in accordance with some embodiments of the present disclosure.

In order to make the above purposes, features, and advantages of some embodiments of the present disclosure more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words “comprise”, “have” and “include” are used in an open-ended fashion, and thus should be interpreted to mean “include, but not limited to . . . ”. Thus, when the terms “comprise”, “have” and/or “include” used in the present disclosure are used to indicate the existence of specific technical features, values, method steps, operations, units and/or components. However, it does not exclude the possibility that more technical features, numerical values, method steps, work processes, units, components, or any combination of the above can be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it can be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present disclosure.

In the present disclosure, the electronic device in FIG. 1 in the present disclosure may include a display device, a backlight device, an antenna device, a sensing device, or a splicing device, etc., but is not limited thereto. The electronic device may be a bendable or flexible electronic device. The display device may be a non-self-luminous display device or a self-luminous display device. The antenna device may be a liquid crystal antenna device or a non-liquid crystal antenna device, and the sensing device may be a sensing device for sensing capacitance, light, heat, or ultrasonic waves, but is not limited thereto. The electronic components may include passive and active components, such as capacitors, resistors, inductors, diodes, transistors, and the like. The diodes may include light-emitting diodes or photodiodes. The light-emitting diode may include organic light-emitting diode (OLED), inorganic light-emitting diode, micro-LED, mini-LED, quantum dot light-emitting diode (QLED, QDLED), other suitable materials or a combination of the above materials, but is not limited thereto. The splicing device may be, for example, a splicing display device or a splicing antenna device, but is not limited thereto. In addition, the display device in the electronic device may be a color display device or a monochrome display device, and the shape of the electronic device may be rectangular, circular, polygonal, a shape with curved edges, or other suitable shapes. In addition, the electronic device described below uses, as an example, the sensing of a touch through an embedded touch device, but the touch-sensing method is not limited thereto, and another suitable touch-sensing method can be used provided that it meets all requirements.

Figure 7:
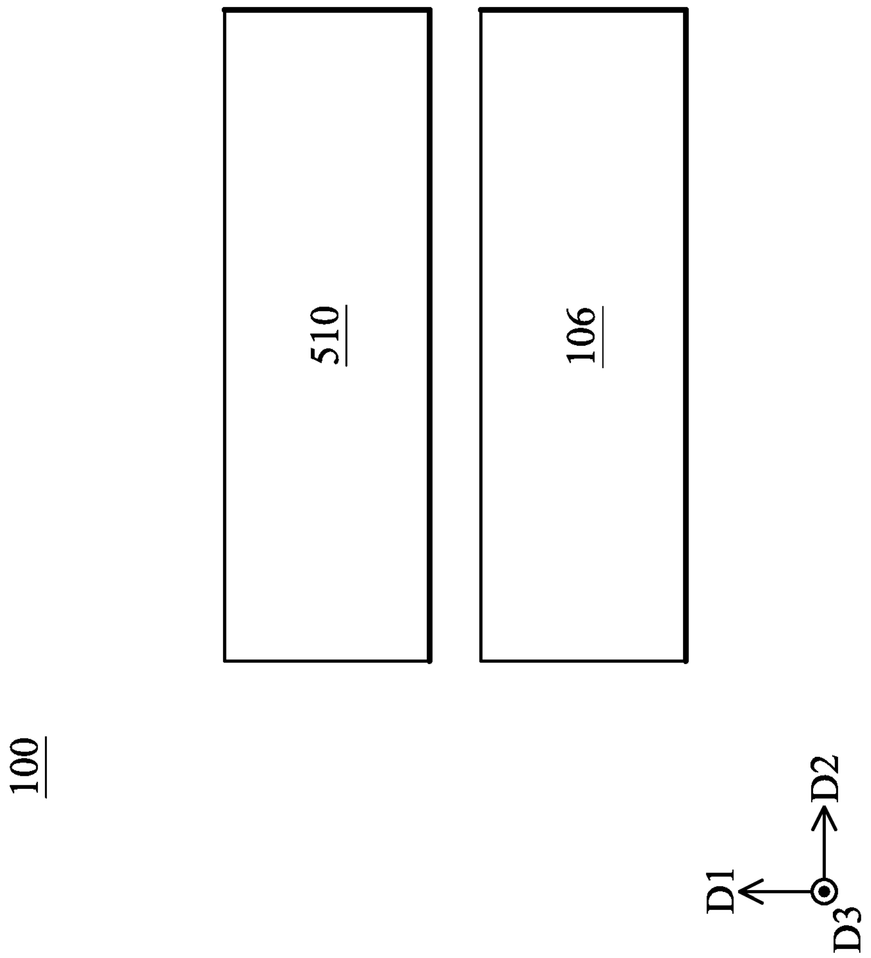
FIG. 7 is a schematic cross-sectional view of the electronic device 100 in FIG. 1 in accordance with some embodiments of the present disclosure.

FIG. 1 is a schematic diagram of an electronic device 100 in accordance with some embodiments of the present disclosure. As shown in FIG. 1, the electronic device 100 includes a control element 102, a temperature sensor 104, a light source module 106, a backlight power 118, a voltage and current sensor 120, and a display panel 510. As shown in FIG. 7, the display panel 510 is disposed on the light source module 106. The light source module 106 provides a light source for the display panel 510. In some embodiments, the light source module 106 can be a backlight module and can be disposed on the back of the display panel 510. The display panel 510 may be a liquid crystal display panel, but the present disclosure is not limited thereto. The temperature senor 104 detects an ambient temperature, and sends the detected ambient temperature to the control element 102 through a notification signal 130. The light source module 106 includes a plurality of light-emitting elements 116. The light-emitting elements 116 may include, for example, organic light-emitting diodes (OLEDs), submillimeter light-emitting diodes (mini LEDs), micro light-emitting diodes (micro LEDs), or quantum dot light-emitting diodes (quantum dot LED), but the present disclosure is not limited thereto. In some embodiments, the control element 102 obtains the first power consumption W1 of the light-emitting elements 116 through the notification signal 132 from the voltage and current sensor 120.

In some embodiments, as shown in FIG. 1, the control element 102 includes a storage unit 160, a comparison unit 162, and a first control unit 112. In detail, the control element 102 includes a first control unit 112, a second control unit 110, and a third control unit 108. The third control unit 108 can be, for example, a microcontroller, and the third control unit 108 may include the storage unit 160 and the comparison unit 162. In some embodiments, the first control unit 112 can be, for example, a timing controller, but the present disclosure is not limited thereto. In some embodiments, the second control unit can be, for example, a vehicle control unit (VCU), but the present disclosure is not limited thereto.

The storage unit 160 stores a look-up table. The look-up table includes different correspondences between different temperature ranges and different power thresholds. The comparison unit 162 receives the first power consumption W1 of the light-emitting elements 116. The comparison unit 162 determines a predetermined power threshold Wp in the different correspondences of the look-up table according to the ambient temperature. The comparison unit 162 compares the first power consumption W1 with the predetermined power threshold Wp to determine the second power consumption W2 of the light-emitting elements 116. The first control unit 112 drives the light-emitting elements 116 according to the second power consumption W2.

As shown in FIG. 1, in some embodiments, the second control unit 110 outputs display data 140 to the first control unit 112. The second control unit 110 can be used to provide the display data 140 to the display panel 510 according to the second power consumption W2. The display data 140 can provide a display mode and a display pattern for the display panel 510. The first control unit 112 receives the display data 140 and correspondingly outputs the light source data 142 to the light source module 106 according to a control signal 136 from the third control unit 108. According to the light source data 142, the light-emitting elements 116 in the light source module 106 can be turned on or off, the luminance of the light-emitting element 116 can be adjusted, the luminance distribution of the light-emitting element 116 can be controlled, and the effect of local dimming can be achieved.

In some embodiments, the first power consumption W1 is obtained by measuring the light-emitting elements 116. In some embodiments, the voltage and current sensor 120 is disposed between the backlight power 118 and the light source module 106 to detect the total voltage and the total current of the light-emitting element 116, and calculate the first power consumption W1 according to the total voltage and the total current, and send the first power consumption W1 to the comparison unit 162 in the third control unit 108 through the notification signal 132. In some embodiments, the light source module 106 enables the light-emitting element 116 to emit light according to the initial light source data 142. The voltage and current sensor 120 detects the total voltage and total current of the light-emitting element 116 that emits light according to the initial light source data 142, and calculates the first power consumption W1 according to the total voltage and the total current. In some embodiments, the light source module 106 provides light to the display panel 510. In some embodiments, the backlight power 118 outputs the power 150 to the light source module 106. The power 150 output by the backlight power 118 is a DC power, such as a DC voltage and a DC current, but the present disclosure is not limited thereto.

Figure 3:
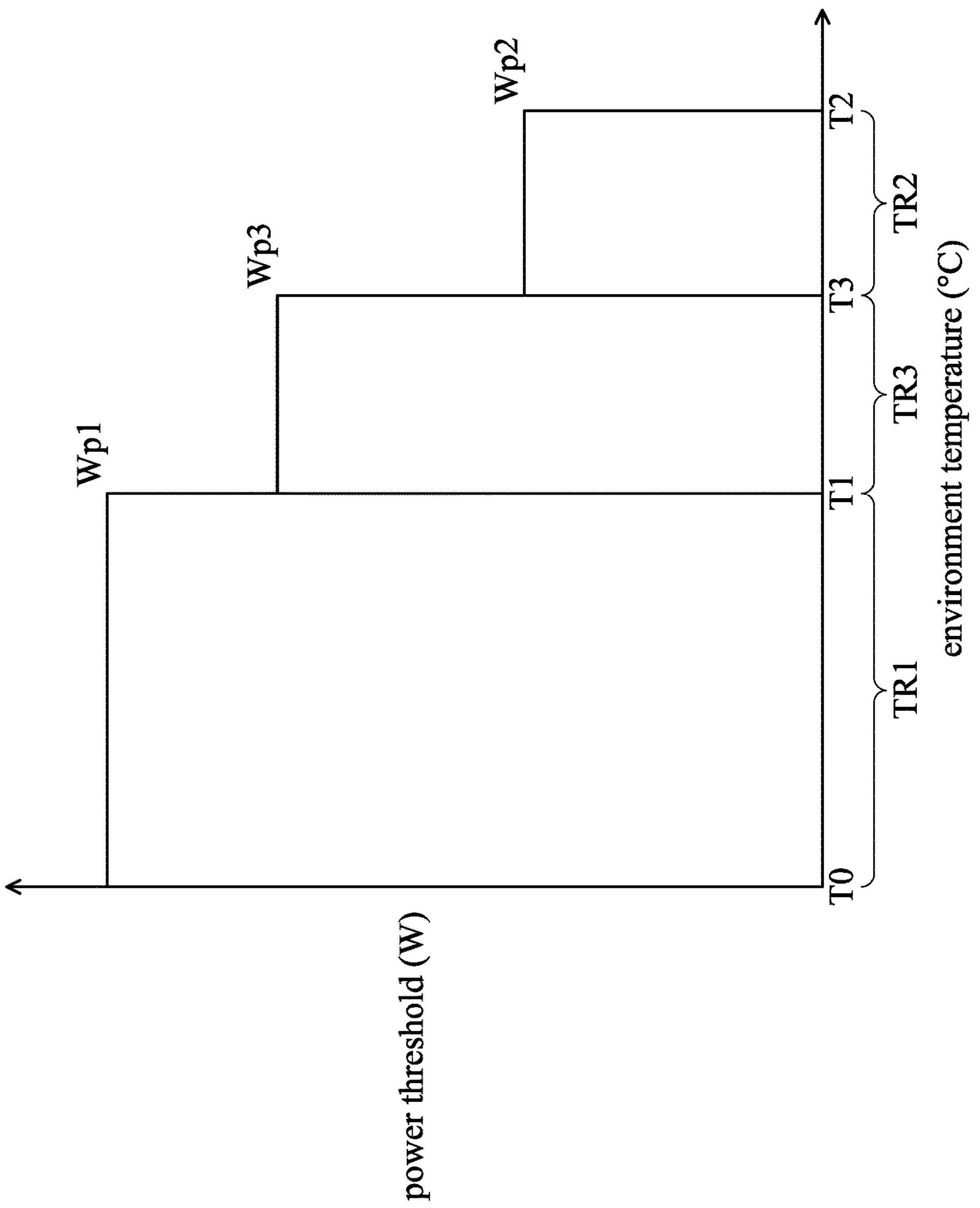
FIG. 3 is a schematic diagram of the correspondences between the power threshold and the ambient temperature in accordance with some embodiments of the present disclosure.

FIG. 3 is a schematic diagram of the correspondences between the predetermined power threshold Wp and the ambient temperature in accordance with some embodiments of the present disclosure. As shown in FIG. 3, the look-up table includes a first correspondence and a second correspondence. The first correspondence is the relationship between the first temperature range TR1 and the first predetermined power threshold Wp1. For example, as shown in FIG. 3, the first temperature range TR1 is between the temperature T0 and T1, and the first predetermined power threshold may be Wp1. The second correspondence is the relationship between the second temperature range TR2 and the second predetermined power threshold Wp2. For example, as shown in FIG. 3, the second temperature range TR2 is between the temperature T3 and T2, and the second predetermined power threshold may be Wp2. The relationship between the temperatures T0 to T3 is T2>T3>T1>T0. The temperature T0 can be 0 degrees Celsius, or the temperature T0 can be a negative value, the present disclosure is not limited thereto. The predetermined power threshold Wp includes the first predetermined power threshold Wp1 and the second predetermined power threshold Wp2. In some embodiments, the second temperature range TR2 is higher than the first temperature range TR1, and the second predetermined power threshold Wp2 is less than first predetermined power threshold Wp1, but the present disclosure is not limited thereto. According to some embodiments, the relationship between other temperature ranges and predetermined power thresholds may be stored in the look-up table. For example, the relationship between the third temperature range TR3 (between the temperatures T1 and T3) and the third predetermined power threshold Wp3 may be stored in the look-up table. The third predetermined power threshold Wp3 may be between the first predetermined power threshold Wp1 and the second predetermined power threshold Wp2. FIG. 3 shows the relationship between the three temperature ranges and the corresponding three predetermined power thresholds stored in the look-up table, but the present disclosure is not limited thereto. The relationship between more than three temperature ranges and corresponding predetermined power thresholds can be stored in the look-up table.

As shown in FIG. 3, as the ambient temperature increases, the power threshold decreases in a three-step manner, but the present disclosure is not limited thereto. In some embodiments, the temperature T1 may be, for example, 60 degrees Celsius, the temperature T2 may be, for example, 85 degrees Celsius, and the temperature T3 may be, for example, 70 degrees Celsius, but the disclosure is not limited thereto. In some embodiments, the first predetermined power threshold Wp1 may be, for example, 40 watts, the second predetermined power threshold Wp2 may be, for example, 15 watts, and the third predetermined power threshold Wp3 may be, for example, 30 watts, but the present disclosure is not limited thereto.

In some embodiments, When the first power consumption W1 is larger than the predetermined power threshold Wp, the second power consumption W2 determined by the comparison unit 162 is less than the first power consumption W1. In other words, the first power consumption W1 is reduced to obtain the second power consumption W2. The light-emitting elements 116 are driven according to the second power consumption W2. When the first power consumption W1 is equal to or less than the predetermined power threshold Wp, the second power consumption W2 determined by the comparison unit 162 is equal to the first power consumption W1. In other words, it is not necessary to adjust the value of the first power consumption W1. That is, the light-emitting elements 116 are driven according to the original first power consumption W1. In some embodiments, the storage unit 160 and the comparison unit 162 may be included in the third control unit 108, but the present disclosure is not limited thereto. The first control unit 112 drives the light-emitting elements 116 according to the second power consumption W2. According to some embodiments, when the first power consumption W1 is equal to the predetermined power threshold Wp, the second power consumption W2 determined by the comparison unit 162 can be equal to, less than, or larger than the first power consumption W1, and can be adjusted according to actual needs.

In some embodiments, when the first power consumption W1 is less than the predetermined power threshold Wp, the second power consumption W2 determined by the comparison unit 162 may be larger than the first power consumption W1. In other words, the first power consumption W1 is increased to obtain the second power consumption W2. And, the light emitting elements 116 are driven according to the second power consumption W2. In some embodiments, the power consumption can be adjusted according to the comparison result between the predetermined power threshold Wp corresponding to the ambient temperature and the first power consumption W1. The adjusted second power consumption W2 may be less than the first power consumption W1, or larger than the first power consumption W1.

In some embodiments, as shown in FIG. 3, when the ambient temperature is within the first temperature range TR1 and the first power consumption W1 of the light-emitting elements 116 is larger than the first predetermined power threshold Wp1, the first control unit 112 in the control element 102 controls the second power consumption W2 of the light-emitting elements 116 to be less than the first power consumption W1. That is, the first power consumption W1 is reduced to the second power consumption W2. For example, the comparison unit 162 outputs the control signal 136 to the first control unit 112, so that the first control unit 112 reduces the luminance of the light-emitting elements 116, thereby reducing the power consumption of the light-emitting elements 116. According to some embodiments, the second power consumption W2 of the light-emitting elements 116 can be controlled to be less than the first predetermined power threshold Wp1.

When the ambient temperature is within the second temperature range TR2, and the first power consumption W1 of the light-emitting elements 116 is larger than the second predetermined power threshold Wp2, the first control unit 112 in the control element 102 can control the second power consumption W2 of the light-emitting elements 116 to be less than the first power consumption W1. According to some embodiments, the second power consumption W2 of the light-emitting elements 116 can be controlled to be less than the second predetermined power threshold Wp2. When the ambient temperature is within the third temperature range TR3, and the first power consumption W1 of the light-emitting elements 116 is larger than the third predetermined power threshold Wp3, the first control unit 112 in the control element 102 controls the second power consumption W2 of the light-emitting elements 116 to be less than the first power consumption W1. According to some embodiments, the second power consumption W2 of the light-emitting elements 116 can be controlled to be less than the third predetermined power threshold Wp3.

In contrast, when the ambient temperature is within the first temperature range TR1 and the first power consumption W1 of the light-emitting elements 116 is less than or equal to the first predetermined power threshold Wp1, the first control unit 112 in the control element 102 does not adjust the first power consumption W1 of the light-emitting elements 116. That is, the second power consumption W2 of the light-emitting elements 116 is equal to the first predetermined power consumption W1. When the ambient temperature is within the second temperature range TR2 and the first power consumption W1 of the light-emitting elements 116 is less than or equal to the second predetermined power threshold Wp2, the first control unit 112 in the control element 102 does not adjust the power consumption of the light-emitting elements 116. That is, the second power consumption W2 of the light-emitting elements 116 is equal to the first power consumption W1 thereof. When the ambient temperature is within the third temperature range TR3 and the first power consumption W1 of the light-emitting elements 116 is less than or equal to the third predetermined power threshold Wp3, the first control unit 112 in the control element 102 does not adjust the power consumption of the light-emitting elements 116. That is, the second power consumption W2 of the light-emitting elements 116 is equal to the first power consumption W1 thereof.

Similarly, in some embodiments, as shown in FIG. 3, when the ambient temperature is within the first temperature range TR1 and the first power consumption W1 of the light-emitting elements 116 is less than the first predetermined power threshold Wp1, the control element 102 can control the second power consumption W2 of the light-emitting elements 116 to be larger than the first power consumption W1. That is, the first power consumption W1 is increased to the second power consumption W2. The increased second power consumption W2 may be less than the first predetermined power threshold Wp1.

In some embodiments, as shown in FIG. 1, the comparison unit 162 receives the ambient temperature from the temperature sensor 104 through the notification signal 130, and receives the first power consumption W1 of the light-emitting elements 116 from the voltage and current sensor 120 through the notification signal 132. After that, the comparison unit 162 obtains the predetermined power threshold Wp corresponding to the ambient temperature in the look-up table according to the ambient temperature, and compares the first power consumption W1 of the light-emitting elements 116 with the predetermined power threshold Wp to determine whether to adjust (for example, reduce or increase) the first power consumption W1 of the light-emitting elements 116.

As mentioned above, the method of changing the light source data 142 can be adopted to drive the light emitting elements 116 according to the lower second power consumption W2 (lower than the first power consumption W1). According to some embodiments, as shown in FIG. 1, according to the control signal 136, the control element 102 (e.g., the first control unit 112) can provide the modified light source data 142A to the light source module 106. With the modified light source data 142A, the first part of the light-emitting elements 116 can be turned on (marked as 116*a*), and the second part of the light-emitting elements 116 can be turned off (marked as 116*b*), so that the light-emitting elements 116 are driven according to the second power consumption W2. In some embodiments, the first control unit 112 reduces the luminance of at least a part of the light-emitting elements 116 to drive the light-emitting elements 116 according to the second power consumption W2. In some embodiments, the first control unit 112 reduces the luminance of all the light-emitting elements 116. In some embodiments, the first control unit 112 reduces the number of light-emitting elements that are turned on in the light-emitting elements 116. FIG. 1 only schematically shows that some light-emitting elements 116 are turned on and some light-emitting elements 116 are turned off, but it is not used to limit the positions of the turned-on light-emitting elements 116*a* and the turned-off light-emitting elements 116*b* in the present disclosure.

In some embodiments, the method of changing the display data 140 can be adopted to drive the light-emitting elements 116 according to the second lower power consumption W2 (lower than the first power consumption W1). As shown in FIG. 1, according to the method of the present disclosure, the method may include outputting an initial display data 140 to the electronic device; and calculating the first power consumption W1 of the light-emitting elements according to the initial display data 140. According to some embodiments, when the comparison unit 162 determines to reduce the first power consumption W1 of the light-emitting element 116 to the lower second power consumption W2, the disclosed method outputs a notification signal 134 according to the second power consumption W2, and modifies the initial display data 140 to modified display data 140A according to the notification signal 134. In detail, the third control unit 108 outputs a notification signal 134 to the second control unit 110 to modify the initial display data 140 to the modified display data 140A. And, the modified display data 140A is sent to the first control unit 112 and sent to the display panel 510. In this way, the electronic device can display according to the modified display data 140A. With the modified display data 140A, the display panel 510 can be changed from a normal mode to a power-saving mode, and/or the display pattern of the display panel 510 can be adjusted, but the present disclosure is not limited thereto.

As mentioned above, according to some embodiments, the look-up table stored in the control element includes different correspondences between different temperature ranges and different power thresholds, with higher temperature ranges corresponding to lower power thresholds. The power consumption for driving the light-emitting unit can be adjusted according to the measured ambient temperature. According to some embodiments, when the measured or calculated power consumption of the light-emitting unit exceeds the power threshold corresponding to the ambient temperature, the first power consumption is reduced to the second power consumption, and the light-emitting elements are driven according to the reduced second power consumption. In this way, the light-emitting element can be protected from exceeding the temperature limit of the element in higher temperatures.

Figure 2:
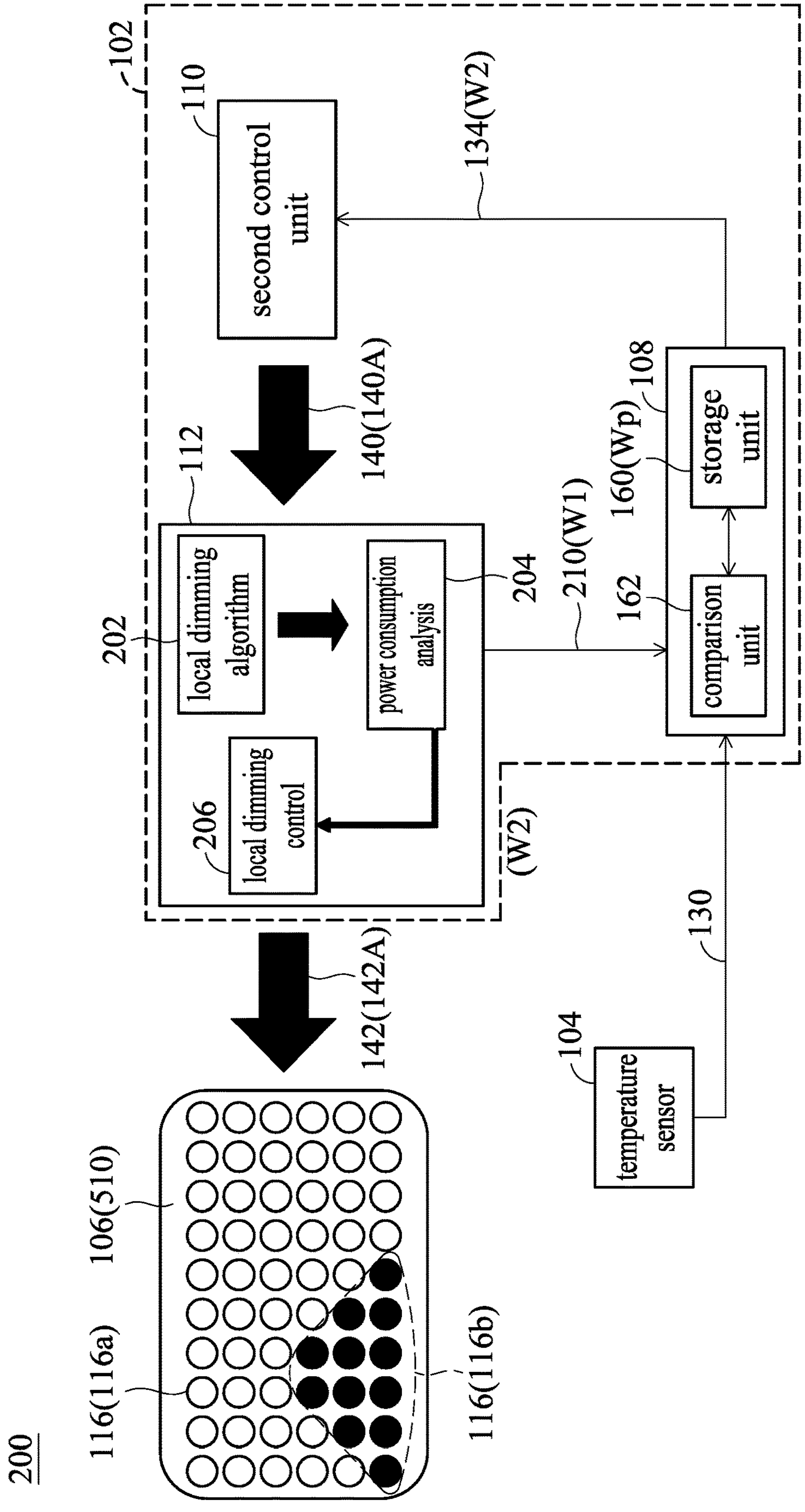
FIG. 2 is a schematic diagram of an electronic device 200 in accordance with some embodiments of the present disclosure.

FIG. 2 is a schematic diagram of an electronic device 200 in accordance with some embodiments of the present disclosure. As shown in FIG. 2, the electronic device 200 includes a control element 102, a temperature sensor 104, a light source module 106, and a display panel 510. The temperature sensor 104 detects the ambient temperature, and sends the detected ambient temperature to the control element 102 through the notification signal 130. The light source module 106 includes the light-emitting elements 116. The control element 102 includes a first control unit 112, a second control unit 110, and a third control unit 108. In some embodiments, the third control unit 108 includes a storage unit 160 and a comparison unit 162. In some embodiments, the second control unit 110 outputs display data 140 to the first control unit 112. The display data 140 can provide a display mode and a display pattern for the display panel 510. The first control unit 112 receives the display data 140. According to the light source data 142, the light-emitting elements 116 in the light source module 106 can be turned on or off, and/or the luminance of the light-emitting elements 116 can be adjusted, and/or the luminance distribution of the light-emitting elements 116 can be controlled, and/or the effect of local dimming can be achieved.

According to some embodiments, the first control unit 112 receives the initial display data 140, calculates the first power consumption W1 of the light-emitting elements 116 according to the initial display data 140, and outputs the first power consumption W1 to the third control unit 108 through a notification signal 210. In detail, the first control unit 112 performs a local dimming algorithm 202 on the initial display data 140, and performs a power consumption analysis 204 on the light-emitting elements 116. Via a notification signal 210, the result of the power consumption analysis 204 is provided to the third control unit 108.

In the power consumption analysis 204 performed by the first control unit 112, the first control unit 112 calculates the power consumption of the light-emitting elements 116 according to "the turn-on area ratio of the light-emitting elements 116" and "the power consumption when the light-emitting elements 116 are fully turned on" in the light source module 106. For example, "the power consumption of the light-emitting elements 116" is equal to "the turn-on area ratio of the light-emitting elements 116" multiplied by "the power consumption when the light-emitting elements 116 are fully turned on". In some embodiments, the comparison unit 162 of the third control unit 108 receives the result of the power consumption analysis 204 from the first control unit 112 through the notification signal 210. That is, after receiving the first power consumption W1 of the light emitting elements 116, the comparison unit 162 of the third control unit 108 obtains the predetermined power threshold Wp corresponding to the ambient temperature in the look-up table according to the ambient temperature, and compares the first power consumption W1 of the light-emitting elements 116 with the predetermined power threshold Wp to determine whether to change the operation information of the power mode.

In a manner similar to the aforementioned embodiment in FIG. 1, it is determined whether to reduce the first power consumption W1 of the light-emitting elements 116 to the lower second power consumption W2 according to the ambient temperature and the corresponding predetermined power threshold Wp in the look-up table, which will not be repeated herein. According to some embodiments, the lower second power consumption (lower than the first power consumption) can be provided according to the method of changing the display data 140 and/or according to the method of changing the light source data 142. According to some embodiments, when the comparison unit 162 determines to reduce the first power consumption of the light-emitting elements 116 to the lower second power consumption, the third control unit 108 outputs a notification signal 134 to the second control unit 110 to modify the initial display data 140 to the modified display data 140A, and sends the modified display data 140A to the first control unit 112, and then to the display panel 510. In this way, with the modified display data 140A, the display panel 510 can be changed from a normal mode to a power-saving mode, and/or the display pattern of the display panel 510 can be adjusted, which can be referred to previous paragraphs and will not be repeated here.

Figure 4B:
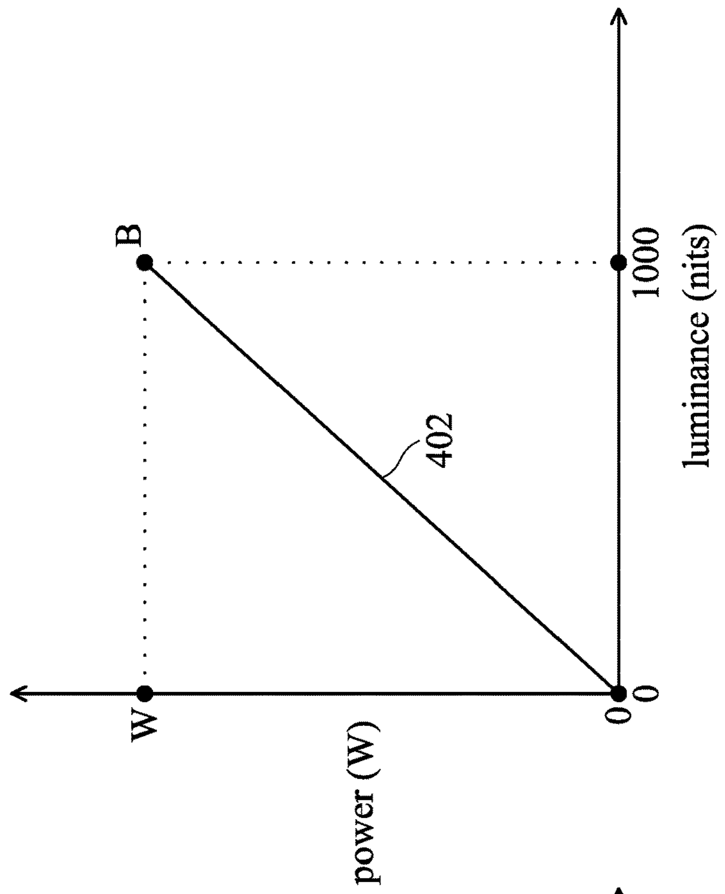
FIG. 4B is a schematic diagram of the correspondences between the power and the luminance in accordance with some embodiments of the present disclosure.
Figure 4A:
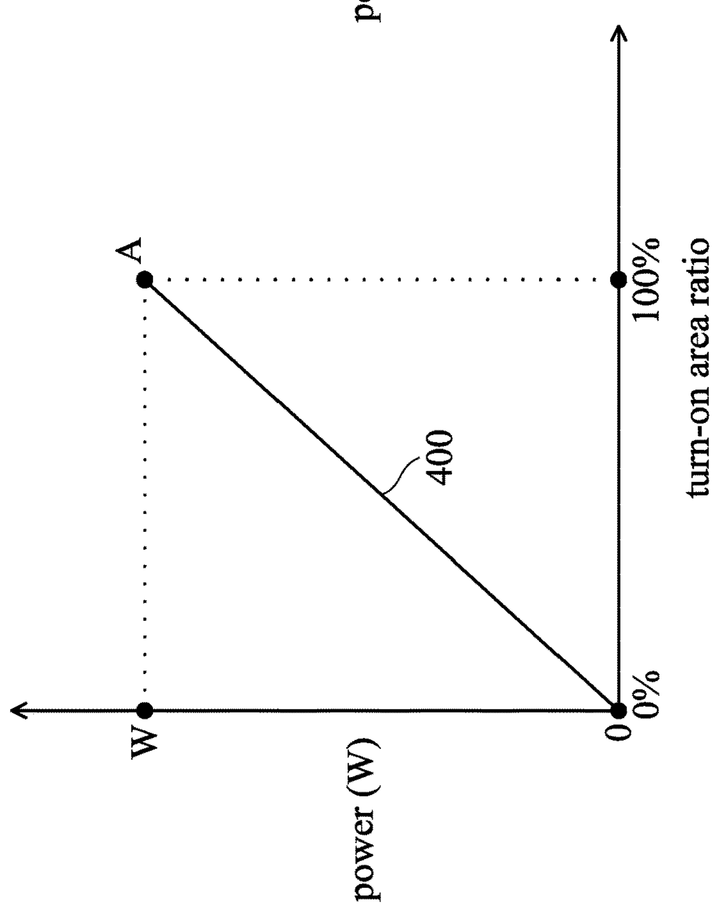
FIG. 4A is a schematic diagram of the correspondences between the power and the turn-on area ratio in accordance with some embodiments of the present disclosure.

FIG. 4A is a schematic diagram of the correspondences between the power and the turn-on area ratio in accordance with some embodiments of the present disclosure. The power on the vertical axis in FIG. 4A represents the power consumption of the light-emitting elements 116 in FIG. 1 and FIG. 2, for example, the sum of the power consumption of all the light-emitting elements 116 in the light source module. The horizontal axis in FIG. 4A represents the turn-on area ratio of the light-emitting elements 116 in FIG. 1 and FIG. 2. As shown in FIG. 4A, the straight line 400 represents the correspondence between the power consumption of the light-emitting elements 116 and the turn-on area ratio of the light-emitting elements 116. For example, the power is proportional to the turn-on area ratio of the light-emitting elements 116. For example, at point A on the straight line 400, the turn-on area ratio of the light-emitting elements 116 is 100%, and the power (that is, the power consumption of the light-emitting elements 116) is equal to the power W. In other words, as the turn-on area ratio of the light-emitting elements 116 increases, that is, the number of the turn-on light-emitting elements 116*a* in FIG. 1 increases, while the number of the turn-off light-emitting elements 116*b* decreases, and the power consumption also increases. The turn-on area ratio of 100% means that all the plurality of light-emitting elements 116 in the light source module are turned on. The turn-on area ratio of 50% means that half of the light-emitting elements 116 of the light source module are turned on.

FIG. 4B is a schematic diagram of the correspondences between the power and the luminance in accordance with some embodiments of the present disclosure. The power on the vertical axis in FIG. 4B represents the power consumption of the light-emitting elements 116 in FIG. 1 and FIG. 2, for example, the sum of the power consumption of all the light-emitting elements 116 in the light source module. The luminance on the horizontal axis in FIG. 4B is the luminance when all the light-emitting elements 116 in FIG. 1 and FIG. 2 are turned on (that is, the turned-on area ratio of 100%). As shown in FIG. 4B, the straight line 402 represents the correspondence between the power consumption of the light-emitting elements 116 and the luminance when all the light-emitting elements 116 are turned on. For example, the power is proportional to the luminance of the light-emitting elements. For example, at point B on the straight line 402, when all the light-emitting elements 116 are turned on, the luminance is 1000 nits, and the power is equal to the power W. In other words, as the luminance of the light-emitting elements 116 are all turned on, the luminance increases, that is, the number of the turn-on light-emitting elements 116*a* in FIG. 1 increases, while the number of the turn-off light-emitting elements 116*b* decreases, and the power consumption also increases.

Figure 5A:
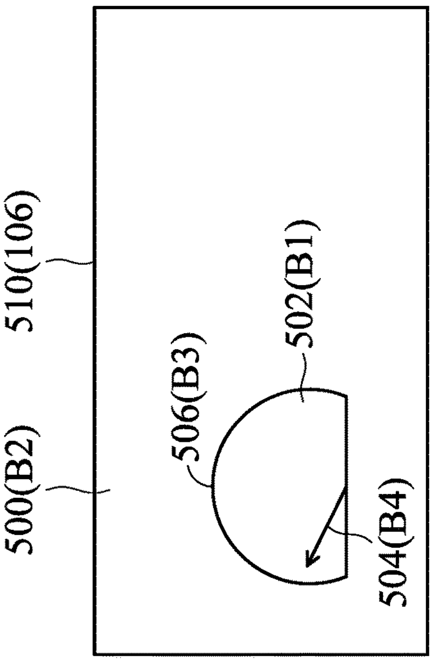
FIG. 5A is a schematic diagram of a display pattern of a display panel 510 in room temperature in accordance with some embodiments of the present disclosure.

FIG. 5A is a schematic diagram of a display pattern of a display panel 510 in room temperature (Tr) in accordance with some embodiments of the present disclosure. As shown in FIG. 5A, the temperature Tr is, for example, 25 degrees Celsius, and for example, the temperature Tr is between the temperatures 0 and T1 in FIG. 3. The display panel 510 can be, for example, a vehicle display panel, such as a dashboard, but the disclosure is not limited thereto. The following uses the dashboard as an example for illustration. The display panel 510 of the electronic device 100 and the electronic device 200 of the present disclosure displays a gauge inner area 502, a pointer line 504, a gauge outline 506, and a background 500. According to some embodiments, the electronic device may include a vehicle body and a vehicle display panel, and the temperature sensor 104 may be used to detect the temperature of the vehicle body. That is, the ambient temperature in the present disclosure may be the ambient temperature of the vehicle body. According to some embodiments, the temperature sensor 104 is disposed on the vehicle body. The vehicle body can be, for example, an outer shell of a vehicle, such as a metal outer shell.

In some embodiments, the electronic device 100 includes a display panel 510 and the light source module 106 in FIG. 1. The light source module 106 can provide a light to the display panel 510. The display panel 510 may be a liquid crystal display panel, but the present disclosure is not limited thereto. At the temperature Tr, the first power consumption W1 of the light-emitting elements 116 may be less than or equal to the first predetermined power threshold Wp1 in FIG. 3. As shown in FIG. 1, the control element 102 can operate in a normal mode, that is, the control element 102 may not adjust the power consumption of the light-emitting elements 116. In detail, the comparison unit 162 of the third control unit 108 does not output the control signal 136 to the first control unit 112, so that the first control unit 112 does not adjust the luminance of the light-emitting elements 116. The light source module 106 can emit light or drive according to the initial light source data 142. According to some embodiments, the comparison unit 162 of the third control unit 108 does not output the notification signal 134 to the second control unit 110, so that the second control unit 110 does not modify the data content of the initial display data. Therefore, the display panel 510 can display according to the initial display data 140. In some embodiments of FIG. 5A, the pattern displayed on the display panel 510 is that the background 500 is brighter and the pointer line 504 is darker. For example, the brightness B1 represents the luminance of the gauge inner area 502, the brightness B2 represents the luminance of the background 500, the brightness B3 represents the luminance of the gauge outline 506, and the brightness B4 represents the luminance of the pointer line 504. The brightness B1 and B2 can be greater than B3 and B4. That is, the brightness B2 of the background 500 is higher than the brightness B4 of the pointer line 504, but the disclosure is not limited thereto.

Figure 5B:
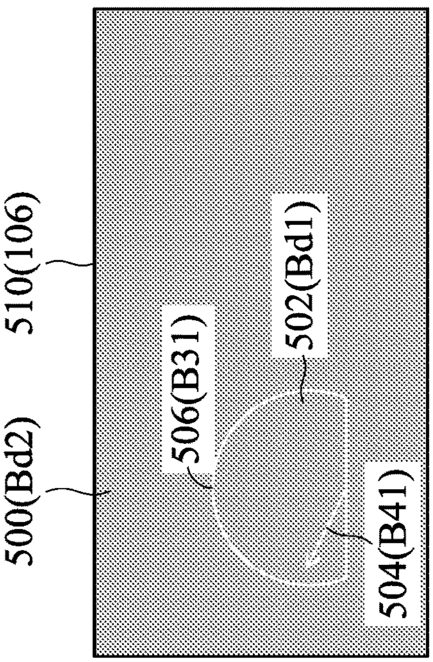
FIG. 5B is a schematic diagram of a display pattern of the display panel 510 in high temperature in accordance with some embodiments of the present disclosure.

FIG. 5B is a schematic diagram of a display pattern of the display panel 510 in high temperature (Th) in accordance with some embodiments of the present disclosure. The temperature Th is higher than the temperature Tr, and the temperature Th is within the second temperature range TR2 between the temperature T3 and the temperature T2 in FIG. 3. When the temperature Tr rises to Th, if the pattern shown in FIG. 5A is still displayed, the first power consumption W1 of the light-emitting elements 116 may be larger than the second predetermined power threshold Wp2 corresponding to the second temperature range TR2 in FIG. 3. In this way, the power consumption may exceed the temperature limit of the light-emitting element, causing damage to the light-emitting element.

Therefore, according to some embodiments, as mentioned above, the method of changing the display data 140, and/or the method of changing the light source data 142 can be adopted to reduce power consumption. That is, the low-power mode can be adopted to achieve the display results such as shown in FIG. 5B. As shown in FIG. 5B, at temperature Th, the first power consumption W1 of the light-emitting element 116 is larger than the second predetermined power threshold Wp2 in FIG. 3, and the control element 102 can control the electronic device to operate in an power-saving mode. For example, the control element 102 can control the power consumption of the light-emitting elements 116 to be less than the second predetermined power threshold Wp2. In detail, the method of changing the display data 140 is adopted. As shown in FIG. 1, the comparison unit 162 in the third control unit 108 outputs a notification signal 134 to the second control unit 110, so that the second control unit 110 modify the display data 140. That is, the initial display data 140 is modified to display data 140A, so that the electronic device 100 in FIG. 1 or the electronic device 200 in FIG. 2 can be displayed according to the modified display data 140A.

According to the modified display data 140A, at the temperature Th, the pattern displayed on the display panel 510 can be as shown in FIG. 5B. In some embodiments of FIG. 5B, the background 500 is darker and the pointer line 504 is brighter. For example, the brightness Bd1 represents the luminance of the gauge inner area 502, the brightness Bd2 represents the luminance of the background 500, the brightness B31 represents the luminance of the gauge outline 506, and the brightness B41 represents the luminance of the pointer line 504. The brightness B31 and B41 can be higher than Bd1 and Bd2. That is, The brightness B41 of the pointer line 504 is higher than the brightness Bd2 of the background 500 and higher than the brightness Bd1 of the gauge inner area 502. The brightness B31 of the gauge outline 506 is higher than the brightness Bd2 of the background 500 and larger than the brightness Bd1 of the gauge inner area 502. That is, the brighter pointer line 504 is still prominently visible and the brighter gauge outline 506 is still prominently visible compared to the darker background 500. Moreover, in the display panel 510, the background 500 occupies a larger area, and the brightness of the background 500 is reduced from the higher brightness B2 in FIG. 5A to the brightness Bd2 in FIG. 5B (Bd2 is smaller than B2). Therefore, the display pattern shown in FIG. 5B can have lower power consumption. Therefore, in general, compared with the display pattern in FIG. 5A, at the temperature Th, the display pattern in FIG. 5B can adjust the second power consumption W2 of the light-emitting elements 116 to be less than the second predetermined power threshold Wp2 corresponding to the temperature Th. In this way, the light-emitting element can be protected from exceeding the temperature limit of the element at the relatively high temperature Th.

Figure 5C:
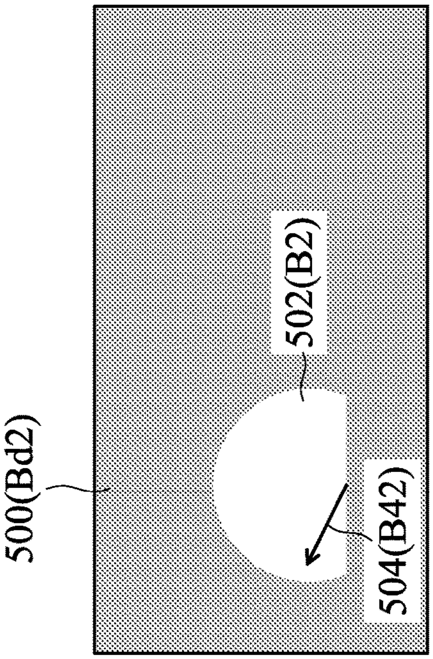
FIG. 5C is a schematic diagram of a display pattern of the display panel 510 in high temperature in accordance with some embodiments of the present disclosure.

FIG. 5C is a schematic diagram of a display pattern of the display panel 510 in high temperature in accordance with some embodiments of the present disclosure. Compared with the display pattern in FIG. 5A at low temperature, similar to FIG. 5B, FIG. 5C changes the display pattern and adopts a low power mode. For related descriptions, please refer to FIG. 5B, and details will not be repeated here. According to the modified display data 140A, at the temperature Th, the pattern displayed on the display panel 510 can be as shown in FIG. 5C. The main difference from FIG. 5B is that, in the display pattern in FIG. 5C, compared with the brightness Bd2 of the background 500, the brightness B2 of the gauge inner area 502 is brighter. Compared with the brightness B42 of the pointer line 504, the brightness B2 of the gauge inner area 502 is brighter. In this way, the darker pointer line 504 is still prominently visible compared to the brighter gauge inner area 502. Moreover, in the display panel 510, the background 500 occupies a relatively large area, and the luminance of the background 500 is reduced from the higher brightness B2 in FIG. 5A to the brightness Bd2 in FIG. 5B (Bd2 is less than B2). Therefore, the display pattern shown in FIG. 5C can have lower power consumption. Therefore, in general, compared with the display pattern in FIG. 5A, at the temperature Th, the display pattern in FIG. 5C can adjust the second power consumption W2 of the light-emitting elements 116 to be less than the second predetermined power threshold Wp2 corresponding to the temperature Th. In this way, the light-emitting element can be protected from exceeding the temperature limit of the element at the relatively high temperature Th.

Figure 6:
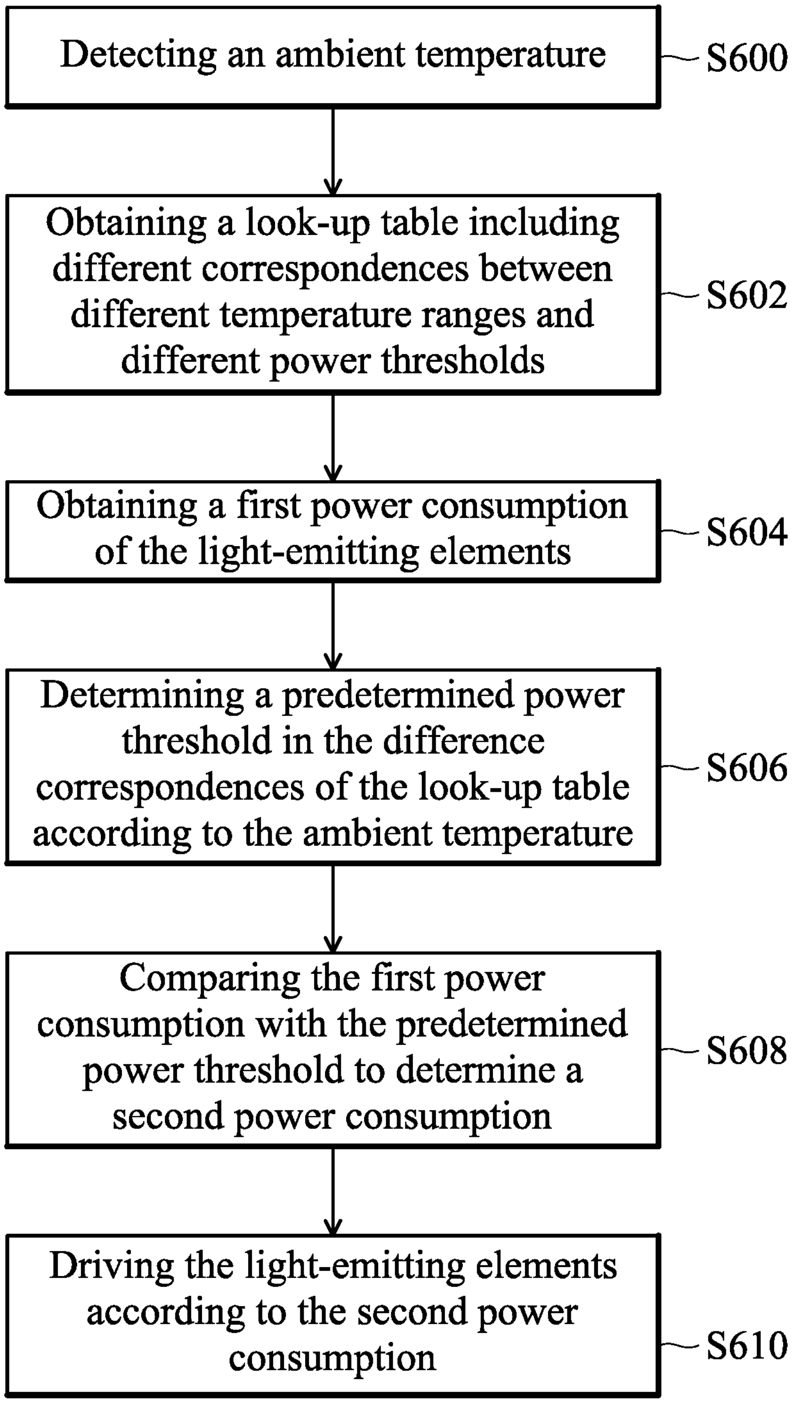
FIG. 6 is a flow chart of a control method for an electronic device in accordance with some embodiments of the present disclosure.

FIG. 6 is a flow chart of a control method for an electronic device in accordance with some embodiments of the present disclosure. The control method of the present disclosure is applicable to the electronic device 100 in FIG. 1 and the electronic device 200 in FIG. 2. The control method includes the following stages. An ambient temperature is detected (step S600). A look-up table including different correspondences between different temperature ranges and different power thresholds is obtained (step S602). The first power consumption of the light-emitting elements is obtained (step S604). The predetermined power threshold in the different correspondences of the look-up table is determined according to the ambient temperature (step S606). The first power consumption and the predetermined power threshold are compared to determine the second power consumption (step S608). The light-emitting elements are driven according to the second power consumption (step S610). In some embodiments, step S600 is performed by the temperature sensor 104 in FIG. 1 and FIG. 2. Steps S602, S604, S606, S608, and S610 are performed by the control element 102 in FIG. 1 and FIG. 2.

In some embodiments, the control method of the present disclosure further includes the following stage. When the first power consumption is higher than the predetermined power threshold, the second power consumption is determined so that the second power consumption is lower than the first power consumption. In step S602, the look-up table includes a first correspondence and a second correspondence. The first correspondence is the relationship between the first temperature range and the first predetermined power threshold. The second correspondence is the relationship between the second temperature range and the second predetermined power threshold. The predetermined power threshold includes the first predetermined power threshold and the second predetermined power threshold. In some embodiments, the control method of the present disclosure further includes the following stage. When the ambient temperature is within the second temperature range and the first power consumption of the light-emitting elements is larger than the second predetermined power threshold, the second power consumption is determined so that the second power consumption is lower than the first power consumption.

In some embodiments, the control element 102 of the electronic device 100 in FIG. 1 and the control element 102 of the electronic device 200 in FIG. 2 include the second control unit 110, the first control unit 112, and the third control unit 108. The third control unit 108 includes the storage unit 160 and the comparison unit 162, the control method of the present disclosure includes the following stages. Initial display data are output to the first control unit 112 in the electronic device. The first power consumption of the light-emitting elements is calculated according to the initial display data. The above-mentioned first step is performed by the second control unit 110, and the above-mentioned second step is performed by the first control unit 112.

In some embodiments, the control method of the present disclosure further includes the following stage. A notification signal is output according to the second power consumption. The initial display data are modified to modified display data according to the notification signal. The electronic device is enabled to display according to the modified display data. In some embodiments, the above-mentioned first step is performed by the comparison unit 162. The above-mentioned second step is performed by the second control unit 110. The above-mentioned third step is performed by the first control unit 112.

FIG. 7 is a schematic cross-sectional view of the electronic device 100 in FIG. 1 in accordance with some embodiments of the present disclosure. As shown in FIG. 7, the electronic device 100 includes the light source module 106 and the display panel 510. In some embodiments, in the direction D1, the display panel 510 is disposed on the light source module 106. In some embodiments, viewed form a top view (in the top view formed by the directions D2 and D3), the display panel 510 and the light source module 106 partially overlap, but the present disclosure is not limited thereto. The direction D1, the direction D2, and the direction D3 may be directions perpendicular to each other. The light source module 106 can provide a light to the display panel 510. The display panel 510 may be a liquid crystal display panel, but the present disclosure is not limited thereto.

The electronic device 100, the electronic device 200, and the control method thereof of the present disclosure refer to the ambient temperature and the power consumption of the light-emitting element to determine whether to perform the power-saving mode, so as to protect the light-emitting element from exceeding temperature limit of the element at high temperature.

In summary, according to some embodiments, the control element may store a look-up table. The look-up table includes different correspondences between different temperature ranges and different power thresholds, and the higher temperature range corresponds to the lower power threshold. The power consumption for driving the light-emitting elements can be adjusted (reduced or increased) according to the measured ambient temperature. According to some embodiments, when the measured or calculated power consumption of the light-emitting elements exceeds the power threshold corresponding to the ambient temperature, the first power consumption is reduced to the second power consumption, and the light-emitting elements are driven according to the reduced second power consumption. In this way, the light-emitting element can be protected from exceeding the temperature limit of the element at higher temperatures. According to some embodiments, when the measured or calculated power consumption of the light-emitting elements is less than the power threshold corresponding to the ambient temperature, the first power consumption is increased to the second power consumption, and the light-emitting elements are driven according to the increased second power consumption.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
- a plurality of light-emitting elements;
- a temperature sensor, configured to detect an ambient temperature; and
- a control element, comprising:
  - a storage unit, configured to store a look-up table comprising different correspondences between different temperature ranges and different power thresholds;
  - a comparison unit, configured to receive a first power consumption of the light-emitting elements, determine a predetermined power threshold in the different correspondences of the look-up table according to the ambient temperature, and compare the first power consumption with the predetermined power threshold to determine a second power consumption; wherein the first power consumption is obtained by measuring the light-emitting elements; and
  - a first control unit, configured to drive the light-emitting elements according to the second power consumption.

2. The electronic device as claimed in claim 1, wherein the determined second power consumption is lower than the first power consumption when the first power consumption is higher than the predetermined power threshold.

3. The electronic device as claimed in claim 1, wherein the determined second power consumption is equal to the first power consumption when the first power consumption is lower than the predetermined power threshold.

4. The electronic device as claimed in claim 1, wherein the look-up table comprises a first correspondence and a second correspondence, the first correspondence is the relationship between a first temperature range and a first predetermined power threshold, the second correspondence is the relationship between a second temperature range and a second predetermined power threshold, and the predetermined power threshold includes the first predetermined power threshold and the second predetermined power threshold,
- wherein the second temperature range is higher than the first temperature range, and the second predetermined power threshold is lower than first predetermined power threshold.

5. The electronic device as claimed in claim 1, wherein the first control unit is configured to enable a first part of the light-emitting elements to be turned on and a second part of the light-emitting elements to be turned off, so as to drive the light-emitting elements according to the second power consumption.

6. The electronic device as claimed in claim 1, wherein the first control unit is configured to enable luminance of at least a part of the light-emitting elements to be reduced, so as to drive the light-emitting elements according to the second power consumption.

7. The electronic device as claimed in claim 1, further comprising:
- a voltage and current sensor, configured to detect a total voltage and a total current of the light-emitting elements, and calculate the first power consumption according to the total voltage and the total current.

8. The electronic device as claimed in claim 1, further comprising:
- a light source module, comprising the light-emitting elements; and
- a display panel, wherein the light source module provides light to the display panel.

9. The electronic device as claimed in claim 8, wherein the control element further comprises:
- a second control unit, configured to provide display data to the display panel according to the second power consumption.

10. The electronic device as claimed in claim 9, wherein the first control unit performs a local dimming algorithm on the display data, and performs a power consumption analysis and a local dimming control on the light-emitting elements.

11. The electronic device as claimed in claim 4, wherein the look-up table comprises a third correspondence, the third correspondence is the relationship between a third temperature range and a third predetermined power threshold.

12. The electronic device as claimed in claim 11, wherein the third temperature range is higher than the first temperature range and lower than the second temperature range; the third predetermined power threshold is lower than first predetermined power threshold and larger than the second predetermined power threshold.

13. A control method for an electronic device, comprising:
- detecting an ambient temperature;
- obtaining a look-up table including different correspondences between different temperature ranges and different power thresholds;
- obtaining a first power consumption of a plurality of light-emitting elements;
- determining a predetermined power threshold in the different correspondences of the look-up table according to the ambient temperature;
- comparing the first power consumption with the predetermined power threshold to determine a second power consumption; and
- driving the light-emitting elements according to the second power consumption.

14. The control method as claimed in claim 13, further comprising:

determining the second power consumption so that the second power consumption is lower than the first power consumption when the first power consumption is higher than the predetermined power threshold.

15. The control method as claimed in claim 13, wherein the look-up table comprises a first correspondence and a second correspondence, the first correspondence is the relationship between a first temperature range and a first predetermined power threshold, the second correspondence is the relationship between a second temperature range and a second predetermined power threshold, and the predetermined power threshold includes the first predetermined power threshold and the second predetermined power threshold, wherein the second temperature range is higher than the first temperature range, and the second predetermined power threshold is lower than first predetermined power threshold.

16. The control method as claimed in claim 15, further comprising:

determining the second power consumption so that the second power consumption is lower than the first power consumption when the ambient temperature is within the second temperature range and the first power consumption of the light-emitting elements is larger than the second predetermined power threshold.

17. The control method as claimed in claim 16, further comprising:

outputting initial display data to the electronic device; and calculating the first power consumption of the light-emitting elements according to the initial display data.

18. The control method as claimed in claim 16, further comprising:

outputting a notification signal according to the second power consumption;

modifying the initial display data to modified display data according to the notification signal; and enabling the electronic device to display according to the modified display data.

19. The control method as claimed in claim 15, wherein the look-up table comprises a third correspondence, the third correspondence is the relationship between a third temperature range and a third predetermined power threshold.

20. The control method as claimed in claim 19, wherein the third temperature range is higher than the first temperature range and lower than the second temperature range; the third predetermined power threshold is lower than the first predetermined power threshold and higher than the second predetermined power threshold.

* * * * *